United States Patent [19]

Chung

[11] Patent Number: 6,069,758

[45] Date of Patent: May 30, 2000

[54] TECHNIQUE FOR REDUCING READ CHANNEL OPTIMIZATION TIME

[75] Inventor: Young-Seok Chung, Seoul, Rep. of Korea

[73] Assignee: SamSung Electronics Co., Ltd., Kyungki-do, Rep. of Korea

[21] Appl. No.: 09/001,691

[22] Filed: Dec. 31, 1997

[30] Foreign Application Priority Data

Dec. 31, 1996 [KR] Rep. of Korea ...................... 96-82658

[51] Int. Cl.[7] ................................................. G11B 27/36
[52] U.S. Cl. ............................... 360/31; 360/53; 360/48; 360/46
[58] Field of Search ................................. 360/53, 48, 31, 360/27, 46, 65, 67; 324/212, 226

[56] References Cited

U.S. PATENT DOCUMENTS

| | | |
|---|---|---|
| 5,047,874 | 9/1991 | Yomtoubian . |
| 5,087,992 | 2/1992 | Dahandeh et al. . |
| 5,121,260 | 6/1992 | Asakawa et al. . |
| 5,247,254 | 9/1993 | Huber et al. . |
| 5,408,367 | 4/1995 | Emo . |
| 5,440,433 | 8/1995 | Yun . |
| 5,471,351 | 11/1995 | Ishiguro . |
| 5,532,586 | 7/1996 | Ishikawa . |
| 5,537,264 | 7/1996 | Pinteric . |
| 5,610,776 | 3/1997 | Oh . |
| 5,657,176 | 8/1997 | Moribe et al. . |
| 5,687,036 | 11/1997 | Kassab . |
| 5,721,816 | 2/1998 | Kusbel et al. .......................... 360/53 X |
| 5,774,285 | 6/1998 | Kassab et al. ............................. 360/31 |
| 5,954,837 | 9/1999 | Kim ...................................... 360/53 X |

*Primary Examiner*—Alan Faber
*Attorney, Agent, or Firm*—Robert E. Bushnell, Esq.

[57] ABSTRACT

A hard disk drive with a reduced read channel optimization test time and a reduced test time difference determines whether or not the time limit for testing the hard disk drive has elapsed whenever the test by the zones and heads is completed, so that the test time difference between the respective drives may be prevented. Further, the test progresses from the last zone to the first zone. Thus, although the test is halted in the course of performing the test, the zone with the high error rate can be tested. In addition, a determination is made as to whether or not the error rate is high or not at the steps of selecting the test track and determining the test off-track. If it is determined that the error rate is high, the total number of sectors to be read for the test will be adjusted, thereby reducing the test time delay due to the high error rate.

14 Claims, 6 Drawing Sheets

FIG. 2 *(Related Art)* ately the read/write channel circuit 18 can read the analog
TECHNIQUE FOR REDUCING READ CHANNEL OPTIMIZATION TIME

CLAIM OF PRIORITY

This application makes reference to and claims all benefits accruing under 35 U.S.C. § 119 from an application for METHOD FOR REDUCING READ CHANNEL OPTIMIZATION TIME earlier filed in the Korean Industrial Property Office on Dec. 31, 1996 and there duly assigned Serial No. 82658/1996.

BACKGROUND OF THE INVENTION

1. Field of the Invention

The present invention relates to a hard disk drive, and, more particularly, to a technique for reducing a read channel optimization time.

2. Description of the Related Art

Recently, a data storage device has required a high capacity and a high access speed, in order to meet the needs of a multimedia system. For example, a hard disk drive (HDD) is one of the typical data storage devices. With an advantage of the high capacity and high access speed, the hard disk drive is widely used as an auxiliary memory for a computer system. Exemplars of recent efforts in the art include such designs as, for example, that shown by U.S. Pat. No. 5,247,254 to Huber et al., entitled Data Recording System Incorporating Flaw Detection Circuitry, U.S. Pat. No. 5,610,776 to Oh, entitled Method Of Optimizing Read Channel Of Disk Drive Recording Apparatus By Using Error, Rate, U.S. Pat. No. 5,440,433 to Yun, entitled Circuit And Method For Adjusting A Data Detecting Level Of A Disk Driving Apparatus, U.S. Pat. No. 5,087,992 to Dahandeh et al., entitled Method For Assigning Tracks On A Magnetic Data Storage Disk To Different Read/Write Frequency Zones, U.S. Pat. No. 5,532,586 to Ishikawa, entitled Method And Apparatus For Detecting Magnetic Disk Defects Using A Complete Disk Erasure Magnet, U.S. Pat. No. 5,471,351 to Ishiguro, entitled Method And Apparatus Of Verifying Accurate Writing Through Comparisons Of Written And Read Data, U.S. Pat. No. 5,537,264 to Pinteric, entitled Method For Optimally Selecting Media Transfer Rates For Different Data Heads Based on Individual Data Head Performance, U.S. Pat. No. 5,408,367 to Emo, entitled Method Of Optimizing Operation Of Disk Drive, U.S. Pat. No. 5,657,176 to Moribe et al., entitled Method And Apparatus For Optimizing The Recording And Reproducing Of Information From Magnetic Disks, U.S. Pat. No. 5,121,260 to Asakawa et al., entitled Read Channel Optimization System, U.S. Pat. No. 5,047,874 to Yomtoubian, entitled Technique For Certifying Disk Recording Surface, and U.S. Pat. No. 5,687,036 to Kassab, entitled Selection Of Optimum Write Current In A Disk Drive To Minimize The Occurrence Of Repeatable Read Errors.

Typically, with these and other designs, a hard disk drive is manufactured by a series of processes which may be classified into six large steps, such as illustrated in FIG. 1. Referring to FIG. 1, in a head disk assembly (HDA) assembling process, a first step I, a head disk assembly is assembled in a clean room, the head disk assembly being a part of the hard disk drive. In a servo write process, a second step II, a servo pattern is written on a disk for a servo control of a magnetic head for reading/writing data on a recording medium, e.g., a disk. The servo write process is performed by a servo writer. In a function test process, a third step III, the head disk assembly is combined with a printed circuit board (PCBA) and a determination is made as to whether or not the head disk assembly is well matched with the printed circuit board. In a burn-in test process, a fourth step IV, is to place the hard disk drive is placed on a rack in a burn-in room having a high temperature and a high humidity, and a program (i.e., firmware) is executed for a long time (commonly from eight to sixteen hours). The burn-in test process checks for defect sectors existing on the disk and takes a proper measure to have the defect sectors not used when the hard disk drive is actually used, so that a user may use the hard disk drive without trouble. Further, the burn-in test process includes a step of optimizing a read channel of the hard disk drive. In a final test process, a fifth step V, a determination is made as to whether or not the defect sectors of the hard disk drive set that have passed the burn-in test are correctly marked, by using a particular test system. After completion of the final test process, the hard disk drive set is sent out as a product by way of a sending-out test process, and a packaging and sending-out process, i.e., the sixth step VI.

In such a hard disk drive assembly as can be used in the practice of the present invention, for example, referring to FIG. 2, a plurality of disks 10 are rotated by a spindle motor 34. A plurality of heads 12 are respectively placed on corresponding disk surfaces of the disks 10. The heads 12 are mounted on support arms extending toward the disks 10 from an E-block assembly 14 associated with a rotary voice coil actuator 30. A preamplifier 16 preamplifies a signal picked up by one of the heads 12 and transfers the amplified analog signal to a read/write channel circuit 18 in a read mode, and writes encoded write data received from the read/write channel circuit 18 on the disks 10 through a corresponding one of the heads 12 in a write mode. The read/write channel circuit 18 detects and decodes a data pulse from the read signal received from the preamplifier 16 and supplies it to a disk data controller (DDC) 20, and/or decodes write data received from the disk data controller 20 and supplies it to the preamplifier 16. The disk data controller 20 writes data received from a host computer on the disks 10 via the read/write channel circuit 18 and the preamplifier 16, and/or transfers data read from the disks 10 to the host computer. Further, the disk data controller 20 interfaces a communication between the host computer and a microcontroller 24. A buffer RAM (Random Access Memory) 22 temporarily stores data being transferred among the host computer, the microcontroller 24, and the read/write channel circuit 18. The microcontroller 24 controls a track seek and a track following in response to a read or write command received from the host computer. A memory 26 stores an execution program of the microcontroller 24 and various setting values. A VCM driver 28 generates a driving current for driving the actuator 30 in response to a head position control signal generated from the microcontroller 24. The driving current generated from the VCM driver 28 is supplied to the actuator 30. The actuator moves the heads 12 on the disks 10 according to a direction and level of the driving current received from the VCM driver 28. A spindle motor driver 32 drives the spindle motor 34 according to a disk rotation control signal generated by the microcontroller 24.

The read/write channel circuit 18 reads data written on the disk 10 and converts it into digital data. Here, how accurately the read/write channel circuit 18 can read the analog signal transferred from the disk 10 via the head 12 is dependent on various parameters of the respective circuit elements in the read/write channel circuit 18. For examples, the parameters are a cut-off frequency, a group delay, a boost level, and a data threshold. When the parameters are optimally set, the host computer can read the data written on the disks 10, with the minimum errors. However, the optimal parameters do not have fixed values, and are slightly variable according to the respective hard disk drives. Further, even the same hard disk drive may also have the parameters slightly variable according to the respective heads and disks. Moreover, even the same disk may also have the parameters slightly variable according to an inner zone or outer zone. Therefore, it is necessary that a process for optimizing the read/write channel circuit 18 have the optimal parameters with respect to the respective zones and heads in the hard disk drive. Such a process is called the read channel optimization process.

Such an earlier read channel optimization process, as illustrated in FIG. 3, operates as follows. Referring to FIGS. 2 and 3, the microcontroller 24 reads from the memory 26 basic parameters that matches a currently selected zone and head, and supply the basic parameters to the read/write channel circuit 18 to set the respective circuit elements therein (step 100). The basic parameters are optimal parameters determined from a plurality of sample hard disk drives, prior to assembling the hard disk drive. The basic parameters are stored into the memory 26. Then, an off-track (i.e., a stress) is set to "0" (step 102), and a data read/write test is performed with respect to a given number of sectors for every track of the corresponding zone (step 104). Commonly, the data read/write test writes test data one time and reads the written test data several times. Then, a track having the minimum number of errors is selected for a track on which a channel optimization test is to be performed (step 106).

Thereafter, the microcontroller 24 performs the data read/write test while decreasing or increasing an off-track value beginning at an intermediate value between the maximum and minimum values (step 108). The microcontroller 24 determines an optimal off-track value having the maximum number of errors out of off-track values whose number of errors, i.e. the result of the data read/write test, falls within a predetermined reference value (step 110). The optimal off-track value becomes a test off-track value. Then, the microcontroller 24 performs the read/write test with respect to a predetermined number of sectors of the test track by predetermined parameter groups (step 112). The number of errors determined by the test result is then stored (step 114). The microcontroller 24 selects a level with the minimum number of errors for the optimal parameter (step 116) value with respect to the respective parameters.

The microcontroller 24 supplies the basic parameters to the read/write channel circuit 18 and performs the read/write test to determine the number of errors (step 118). Then, the microcontroller 24 supplies the selected optimal parameter value to the read/write channel circuit and perform the read/write test to determine the number of errors (step 120). Thereafter, the microcontroller 24 selects a better one of the test results for the optimal parameter value (step 122). Then, the optimal parameter value is stored in the memory 26 or written on a maintenance area of the disk 10 (step 122).

In case of a drive having a high error rate, the above mentioned process has a problem of taking a long time. Further, since the drives have different error rates, there will be a test time difference between a drive with a low error rate and a drive with a high error rate. In case an error is generated in a particular sector on the disk, the head commonly again reads data from the next sector. Thus, in order to read the data again from the next sector, the head must wait for one disk rotation time, i.e., a time for which the disk rotates in order for the next sector to return again to the head. Therefore, whenever the error is generated, the disk must make one rotation, resulting into an increase in the test time.

Further, as mentioned in the foregoing, in order to determine the optimal values of the respective parameters, the device must read the predetermined number of sectors, so that the drive with the high error rate may take a long time to test. Further, in case of the drive with the high error rate, the number of errors may exceed a reference value in spite of a low off-track value, so that it takes a long time to determine the test off-track value. Moreover, in order to set the test off-track value, the off-track value is tested beginning at the intermediate value between the maximum value and the minimum value. Thus, the test must be repeated until the off-track value reaches the minimum value. Accordingly, the drive with the high error rate will take a longer test time, compared with the drive with the low error rate. Further, the earlier device has a great test time difference according to the drives, so that it may not be easy to consider a proper countermeasure in a process for making the hard disk drive.

SUMMARY OF THE INVENTION

It is therefore an object of the present invention to provide a technique for reducing a read channel optimization test time.

It is another object to provide a technique for reducing a test time difference according to drives, during a read channel optimization test.

It is still another object to provide a technique that enhances the performance of a read channel optimization test.

According to an aspect of the present invention, a determination is made as to whether or not the number of errors determined at a step for selecting a test track exceeds a reference value. If the number of errors exceeds the reference value, a microcontroller determines an off-track value in the light of the above determination, considering that the error rate is high.

Further, if the number of errors exceeds the reference value, the off-track value is tested beginning at a value adjacent to a minimum off-track value, to prevent an unnecessary test.

In addition, a test off-track value is compared with a reference off-track value. As the result, if the test off-track value is smaller than the reference off-track value, the microcontroller tests a smaller number of sectors than an original number of test sectors, considering that the error rate is high. Moreover, if a time limit for which one drive is tested has elapsed, the test is ended.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
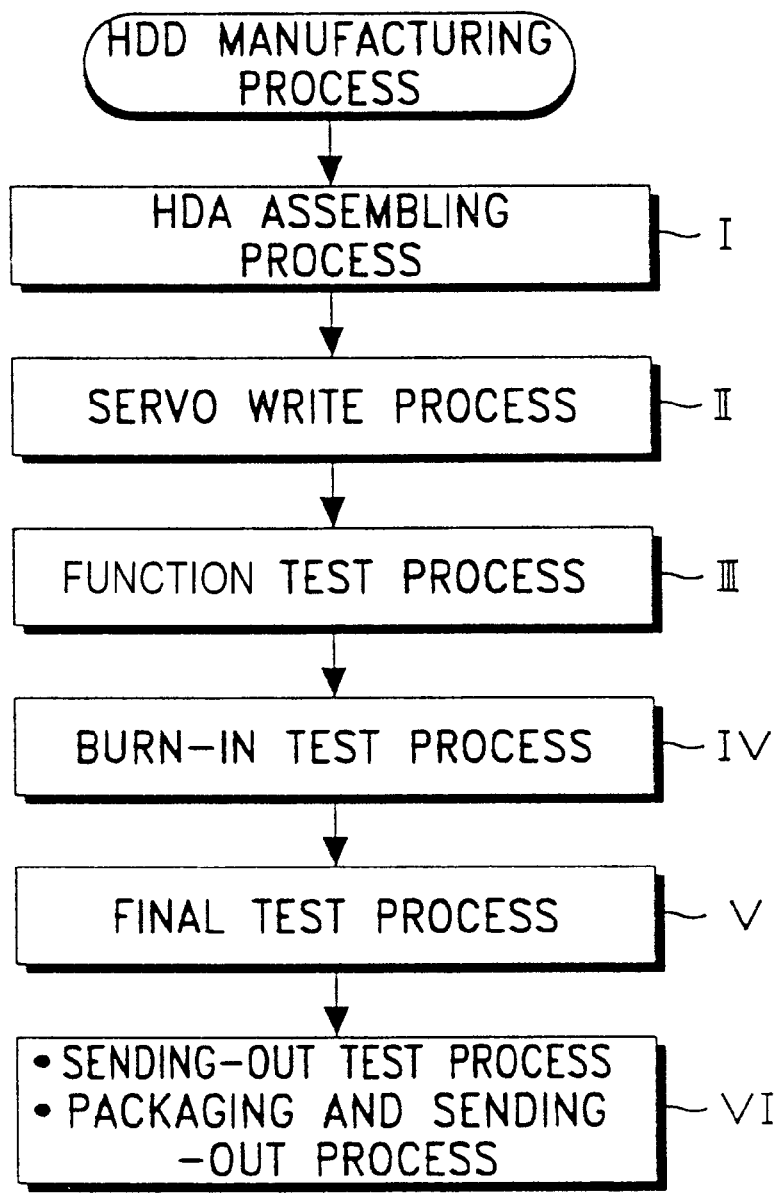
FIG. 1 is a process flow for manufacturing a hard disk drive.

A preferred embodiment of the present invention will be described in detail hereinbelow with reference to the attached drawings, in which the like reference numerals represent the like elements.

FIG. 1 illustrates a head disk assembly assembling process as discussed above in the Description of the Related Art.

Figure 2:
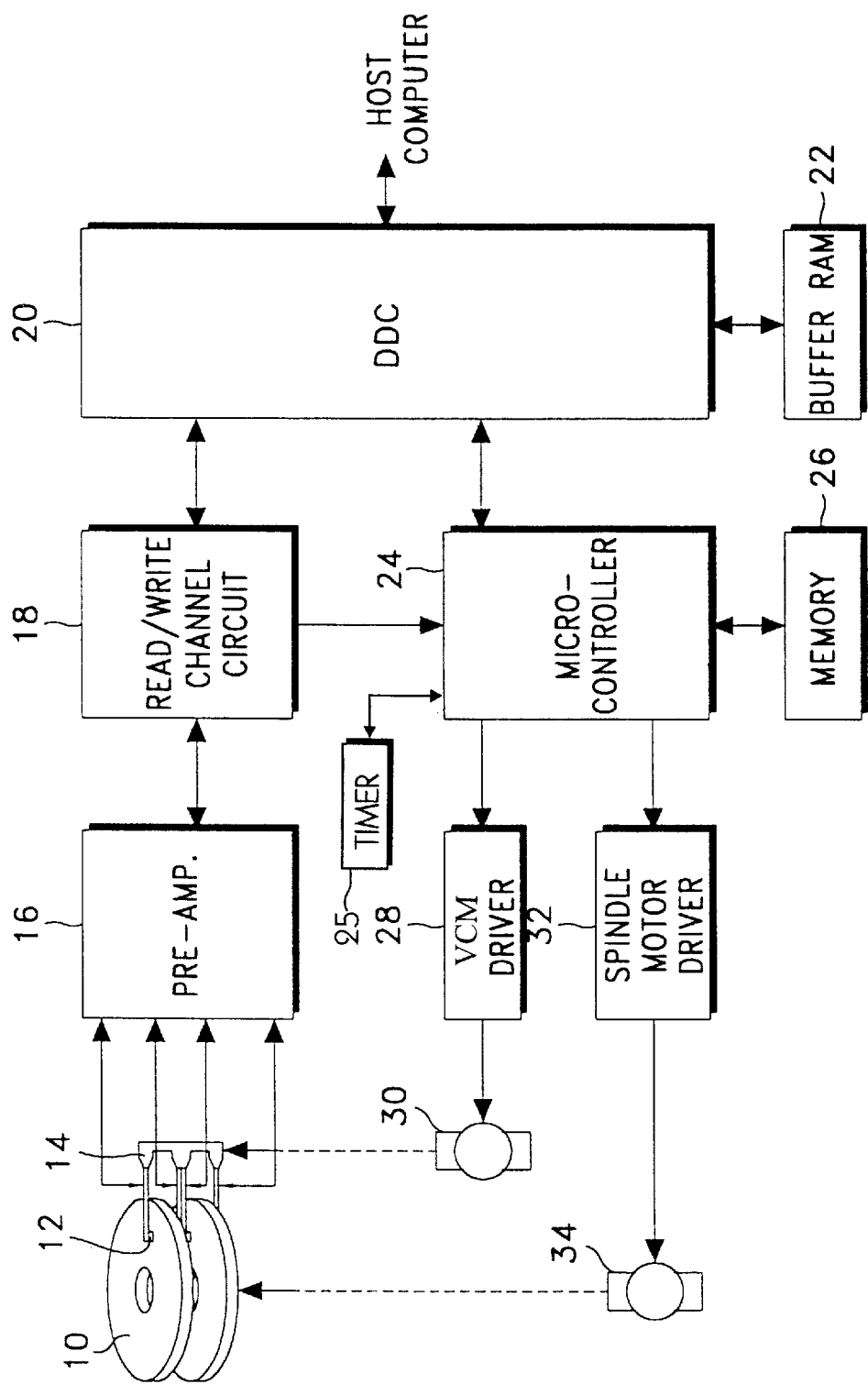
FIG. 2 is a system block diagram of a hard disk drive for the practice of the present invention.

FIG. 2 illustrates a hard disk drive assembly as can be used for the practice of the as discussed above in the Description of the Related Art, constructed with plurality of disks 10, plurality of heads 12, the heads 12 being mounted on support arms extending toward the disks 10 from an E-block assembly 14 associated with rotary voice coil actuator 30, and disk data controller 20, and microcomputer 24 and a timer 25. Further illustrated is buffer random access memory 22, a memory 26, and VCM driver 28 and spindle motor driver 32 and spindle motor 34, as previously discussed.

Figure 3:
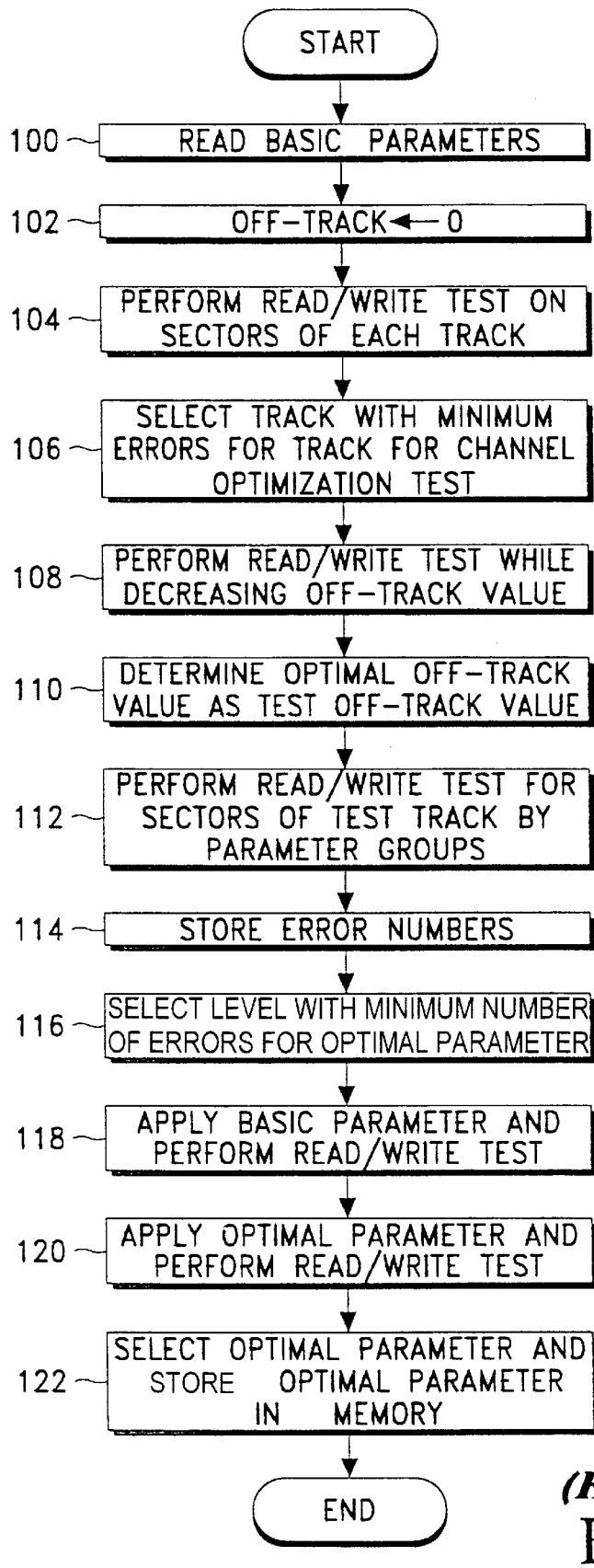
FIG. 3 is a flowchart of an earlier read channel optimization process.
Figure 4A:
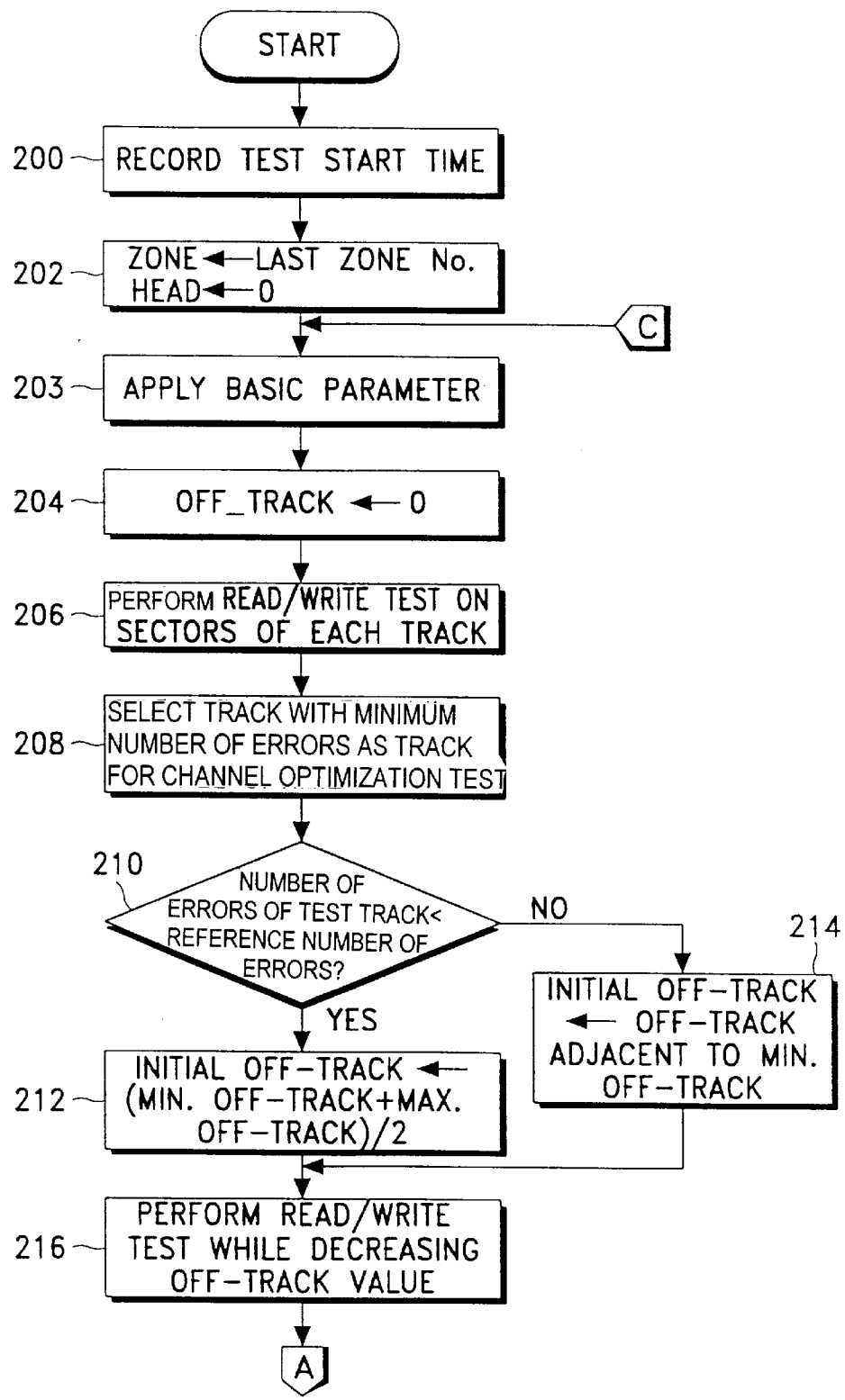
FIGS. 4A and 4C together form a flowchart of a process for reducing a read channel optimization test time in accordance with the principles of the present invention.
Figure 4B:
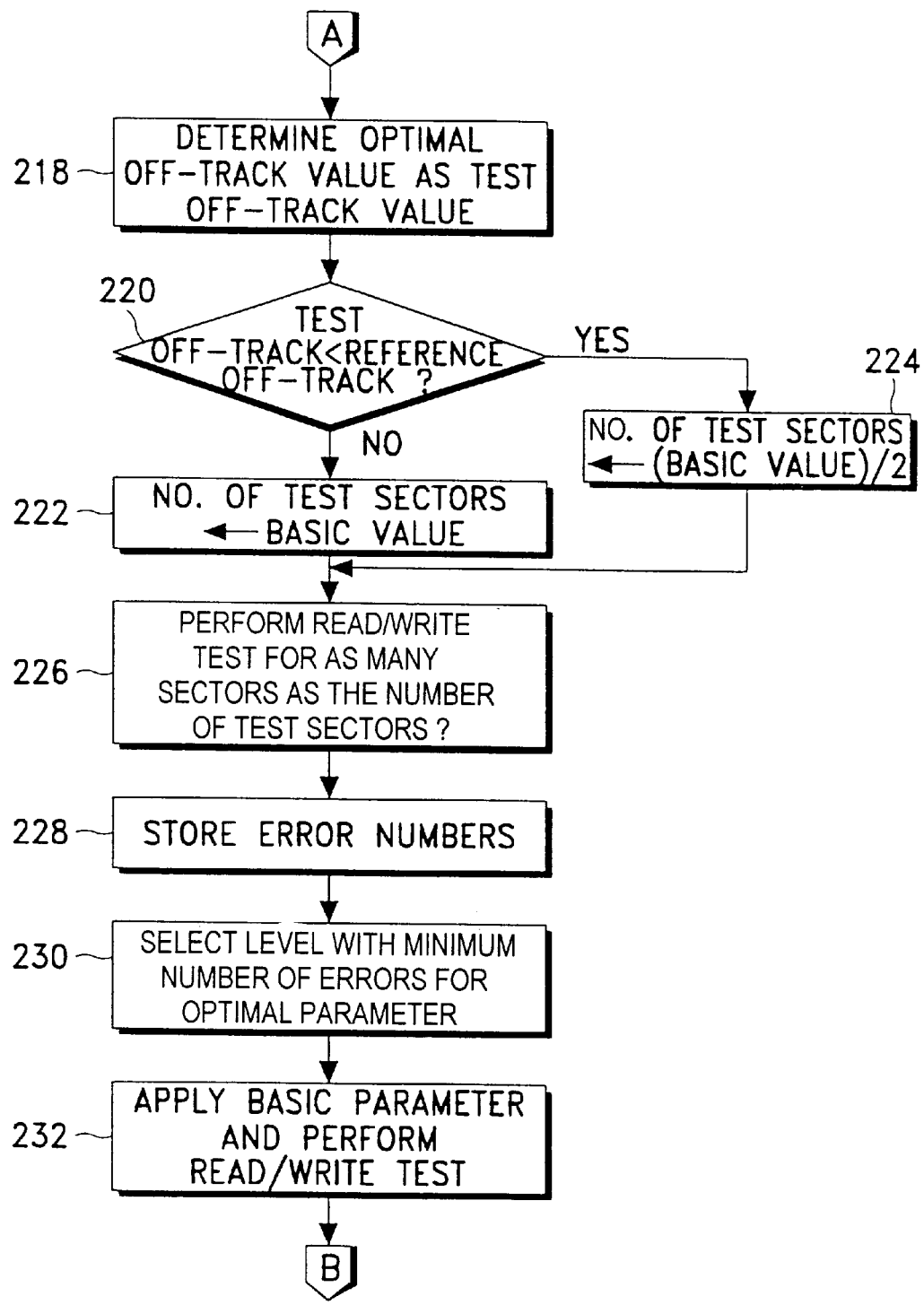
Figure 4C:
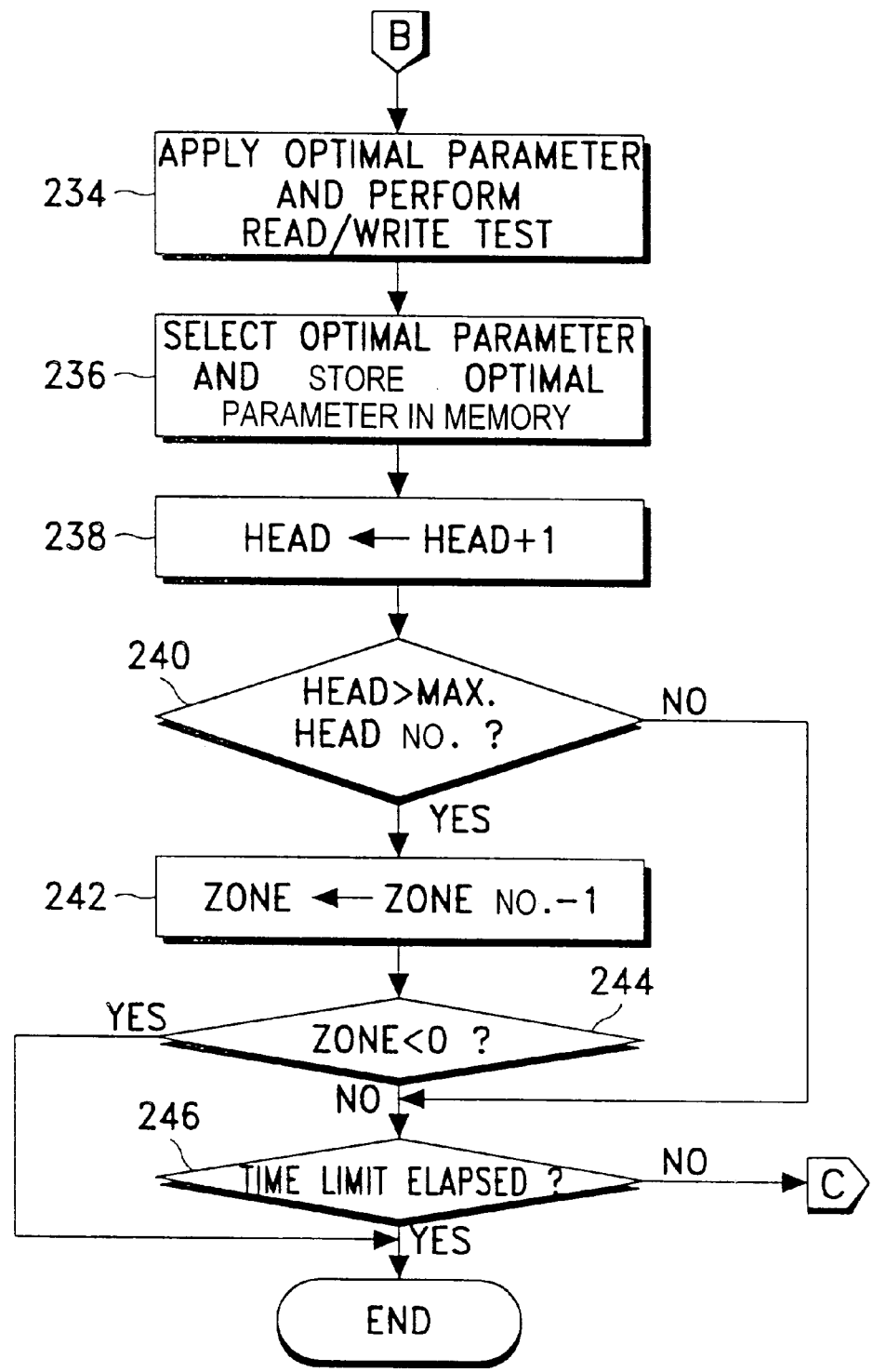

FIG. 3, as previously discussed illustrates the earlier read channel optimization process discussed above in the Description of the Related Art in which steps step 100–122 correspond to those steps discussed in detail above.

Referring now to FIGS. 2 and 4A–4C, which together illustrate processes and apparatus as can be used for reducing a read channel optimization test time according to the present invention, microcontroller 24 records a test start time by using timer 25 at a step 200. The timer 25 is used to check whether the read channel optimization time has exceeded a predetermined time limit. The time limit refers to an average time for which one hard disk drive optimizes the read channel.

At step 202, a test zone is set to a zone of the last number and the head is set to a first head. In a zone bit recording technique that most hard disk drives adopt, the disk includes a plurality of zones formed thereon along concentric circles. The respective zones have inherent numbers assigned thereto beginning at an outer zone. Therefore, the zone with the last number stated above references to a zone positioned at an innermost concentric circle.

At step 203, the microcontroller 24 reads from the memory 26 the basic parameters matching the currently selected zone and head, and supplies the basic parameters to the read/write channel circuit 18. The basic parameters are optimal parameters determined from a plurality of sample hard disk drives, prior to assembling the hard disk drive. The basic parameters are stored in the memory 26. Then, an off-track (i.e., a stress test) is set to "0" at a step 204, and a data read/write test is performed with respect to a given number of sectors for every track of the corresponding zone at step 206. Commonly, the data read/write test writes test data one time and reads the written test data several times. As the result of the read/write test, a track having the minimum number of errors is selected for a track on which a channel optimization test is to be performed, at a step 208.

The microcontroller 24 checks, at step 210, whether or not the number of errors of the selected test track is smaller than a reference number of the errors. If it is smaller than the reference number of errors, the microcontroller 24 performs the data read/write test while decreasing an off-track value beginning at an intermediate value between the maximum and minimum values, at steps 212 and 216. However, if the number of errors of the selected test track is larger than the reference number of the errors, then the microcontroller 24 performs the data read/write test while decreasing the off-track value beginning at a value adjacent to the minimum value, at steps 214 and 216. Then, at a step 218, the microcontroller 24 determines an optimal off-track value having the maximum number of errors out of off-track values whose number of errors, i.e. the result of the data read/write test, falls within a predetermined reference value. The optimal off-track value becomes the test off-track value.

The microcontroller 24 checks, at a step 220, whether or not the test off-track value is smaller than a predetermined reference off-track value. If it is larger than the predetermined reference off-track value, the number of the test sectors is set to a conventional basic value, at a step 222. The microcontroller 24 performs as many read/write tests with respect to sectors as the number of tests of the test track by predetermined parameter groups, at a step 226. However, if the test off-track value is smaller than a predetermined reference off-track value, the number of the test sectors is set to half the basic value, at a step 224. Thereafter, the procedure goes to the step 226 to perform as many read/write tests with respect to sectors as half the number of tests of the test track by the predetermined parameter groups.

The processes of steps 228 through 238 are the same as the conventional read channel optimization process of the steps 114 through 122 of FIG. 3. That is, at the step 228, the microcontroller 24 stores the number of errors determined by the test result of the step 226. The microcontroller 24 selects a level with the minimum errors for the optimal parameter value with respect to the respective parameters, at a step 230.

The microcontroller 24 supplies the basic parameters to the read/write channel circuit 18 and performs the read/write test to determine the number of errors, at a step 232. Then, at a step 234, the microcontroller 24 supplies the optimal parameter value selected at the step 230 to the read/write channel circuit 18 and performs the read/write test to determine the number of errors.

Thereafter, at a step 236, the microcontroller 24 selects a better one of the test results by the steps 232 and 234 for the optimal parameter value. Then, the optimal parameter value is stored in the memory 26 or written in a maintenance area of the disk 10.

The microcontroller 24 selects a head next to the current test head at a step 238, and checks, at a step 240, whether or not the selected head number is larger than the maximum head number in the hard disk drive. If not, the microcontroller 24 will switch over to the selected next head and perform the read channel optimization process with respect to the currently selected zone. However, prior to performing the read channel optimization process, the microcontroller 24 checks whether or not the read channel optimization time up to now has exceeded a predetermined time limit, at a step 246. The time limit refers to an average time for which one hard disk drive optimizes the read channel. If the time limit has not elapsed, the microcontroller 24 will return to the step 203 to repeat the step 203 and the succeeding steps. However, if the time limit has elapsed at the step 246, the microcontroller will end the read channel optimization process.

Meanwhile, if the selected head number is larger than the maximum head number in the hard disk drive at the step 240, it is meant that the read channel optimization has been performed for all the heads of the current zone. Thus, the microcontroller 24 sets the test zone to the next zone, at a step 242. If the current zone is the last zone, the next zone will be a zone preceding the last zone. Thereafter, the microcontroller 24 checks, at a step 244, whether or not the set zone is smaller than a first zone. If it is larger than the first zone, it is meant that some zones remain to be tested. In that case, the microcontroller 24 goes to the step 246 to check whether or not the read channel optimization time up to now has exceeded the predetermined time limit. If the time limit has elapsed, the microcontroller will end the read channel optimization process. Otherwise, the microcontroller 24 will return to the step 203 to repeat the step 203 and the succeeding steps.

Summarizing the steps 203 through 246, the read channel optimization process is performed for the last zone from the first head to the last head. Thereafter, the read channel optimization process is performed for the zone preceding the last zone from the first head to the last head. In this manner, the read channel optimization process is finally performed for the first zone from the first head to the last head.

Further, as can be appreciated from the step 246, the microcontroller 24 has the time limit for which one drive is tested, to end the test in case that the time limit has elapsed. The time limit is checked by using the timer 25 stated in the step 200. In addition, the test zone progresses from the last zone to the first zone. Commonly, the hard disk drive has a higher error rate, as the zone gets close to the last zone. Thus, although the procedure is ended with the lapse of the time limit, the channel optimization process is performed with respect to the zone and head having the high error rate.

If the error number of the test tracks determined at the steps 203 through 208 exceeds the reference value, the microcontroller 24, considering that the error rate is high, performs the process for determining the test off-track value in the light of the above (see steps 210 through 218). That is, if the number of errors exceeds the reference number of errors, the test is performed beginning at the value adjacent to the minimum off-track value, so as to prevent an unnecessary test.

Further, the test off-track value is compared with the reference off-track value. As the result, if the test off-track value is smaller than the reference off-track value, the microcontroller will test the smaller number of sectors than the original number of test sectors, considering that the error rate is high (see steps 220 and 224). Therefore, the test time may be reduced.

As described in the foregoing, it is checked whether or not the time limit for testing the hard disk drive has elapsed whenever the test by the zones and heads is completed, so that the test time difference between the respective drives may be prevented. Further, the test progresses from the last zone to the first zone. Thus, although the test is halted in the course of performing the test, the zone with the high error rate can be tested. In addition, it is checked whether the error rate is high or not at the steps of selecting the test track and determining the test off-track. If it is judged that the error rate is high, the total number of sectors to be read for the test will be adjusted, thereby reducing the test time delay due to the high error rate.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method of reducing a read channel optimization time of a hard disk drive, comprising the steps of:

determining a test track and a number of errors of the test track using a data read and write test within a current zone of a disk;

comparing a predetermined reference number of errors with the number of errors of the test track;

when the number of errors of the test track exceeds the predetermined reference number of errors, determining a test off-track value while decreasing an off-track value beginning at a value adjacent to a minimum off-track value;

when the number of errors of the test track does not exceed the predetermined reference number of errors, determining the test off-track value while decreasing the off-track value beginning at an intermediate value for the off-track value between a maximum value for the off-track value and the minimum off-track value;

comparing the test off-track value with a predetermined reference off-track value;

when the test off-track value does not exceed the predetermined reference off-track value, determining that a number of test sectors is smaller than a basic reference value;

when the test off-track value exceeds the predetermined reference off-track value, determining that the number of test sectors is the same as the basic reference value; and performing a read channel optimization test with respect to a zone and a head by using the test track, the test off-track value, and the number of the test sectors.

2. The method of reducing a read channel optimization time according to claim 1, further comprising the step of checking, upon every completion of each test by zone and head, whether a time limit, which is an average time for which one hard disk drive performs a read channel optimization, has been reached and ending the read channel optimization test for the hard disk drive when the time limit has been reached.

3. The method of reducing a read channel optimization time according to claim 2, further comprised of said time limit being checked by using a timer.

4. The method of reducing a read channel optimization time according to claim 2, further comprised of the read channel optimization test being performed with respect to all heads of the hard disk drive in turn beginning at an innermost zone of the disk, and proceeding to a next zone of the disk to perform the read channel optimization test with respect to all heads of the head disk drive in turn until said time limit has been reached.

5. The method of reducing a read channel optimization time according to claim 2, further comprised of determining the test track by selecting a track having a minimum number of errors as the test track.

6. The method of reducing a read channel optimization time according to claim 1, further comprised of the number of test sectors being set to one half of the basic reference value when it is determined at said step for determining the number of test sectors that the test off-track value does not exceed the predetermined reference off-track value.

7. The method of reducing a read channel optimization time according to claim 1, further comprised of determining the test track by selecting a track having a minimum number of errors as the test track.

8. An apparatus for reducing a read channel optimization time of a hard disk drive, comprising:

a means for determining a test track and a number of errors of the test track using a data read and write test within a current zone of a disk;

a means for comparing a predetermined reference number of errors with the number of errors of the test track;

a means for determining a test off-track value by decreasing an off-track value beginning at a value adjacent to a minimum off-track value when the number of errors of the test track exceeds the predetermined reference number of errors and, when the number of errors of the test track does not exceed the predetermined reference number or errors, by decreasing the off-track value beginning at an intermediate value for the off-track value between a maximum value for the off-track value and the minimum off-track value;

a means for comparing the test off-track value with a predetermined reference off-track value;

a means for determining a number of test sectors, the means for determining the number of test sectors for determining that the number of test sectors is smaller than a basic reference value when the test off-track value does not exceed the predetermined reference off-track value, and for determining that the number of test sectors is the same as the basic reference value, when the test off-track value exceeds the predetermined reference off-track value; and a means for performing a read channel optimization test with respect to a zone and a head by using the test track, the test off-track value, and the number of the test sectors.

9. The apparatus for reducing a read channel optimization time according to claim 8, further comprising a means for checking, upon every completion of each test by zone and head, whether a time limit, which is an average time for which one hard disk drive performs a read channel optimization, has been reached and for ending the read channel optimization test for the hard disk drive when the time limit has been reached.

10. The apparatus for reducing a read channel optimization time according to claim 9, further comprising a timer for checking said time limit.

11. The apparatus for reducing a read channel optimization time according to claim 9, further comprised of the read channel optimization test being performed by said means for performing the read channel optimization test with respect to all heads of the hard disk drive in turn beginning at an innermost zone of the disk, and proceeding to a next zone of the disk to perform the read channel optimization test with respect to all heads of the hard disk drive in turn until said time limit has been reached.

12. The apparatus for reducing a read channel optimization time according to claim 8, further comprised of said means for determining the number of test sectors determining the number of test sectors to be one half of the basic reference value when it is determined by said means for determining the number of test sectors that the test off-track value does not exceed that predetermined reference off-track value.

13. The apparatus for reducing a read channel optimization time according to claim 8, further comprised of the read channel optimization test being performed by said means for performing the read channel optimization test with respect to all heads of the hard disk drive in turn beginning at an innermost zone of the disk, and proceeding to a next zone of the disk to perform the read channel optimization test with respect to all heads of the hard disk drive in turn.

14. The apparatus for reducing a read channel optimization time according to claim 8, further comprised of the means for determining the test track selecting the test track as a track having a minimum number of errors.

* * * * *